United States Patent [19]
Mead, Jr. et al.

[11] Patent Number: 6,094,180
[45] Date of Patent: *Jul. 25, 2000

[54] GIMBAL-MOUNTED VIRTUAL REALITY DISPLAY SYSTEM

[75] Inventors: Russell C. Mead, Jr., San Francisco; Mark Bolas, Mountain View; Ian McDowall, Palo Alto, all of Calif.

[73] Assignee: Fakespace, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/630,948

[22] Filed: Apr. 5, 1996

[51] Int. Cl.$^7$ ........................................... G09G 5/00
[52] U.S. Cl. ..................... 345/8; 345/156; 248/603; 361/681; 434/43
[58] Field of Search .................. 248/188.1, 603, 248/160, 622, 163.1, 274.1, 188.3, 188.7; 345/8, 156, 157, 161, 7, 9; 434/35, 36, 37, 38, 39, 40, 41, 42, 43, 44; 361/681, 682; 359/427

[56] References Cited

U.S. PATENT DOCUMENTS

| | | | |
|---|---|---|---|
| 3,288,421 | 11/1966 | Peterson | 248/163.1 X |
| 3,295,224 | 1/1967 | Cappel | 248/163.1 X |
| 3,374,977 | 3/1968 | Moy, Jr. | 248/163.1 |
| 4,066,256 | 1/1978 | Trumbull | 472/60 |
| 4,069,995 | 1/1978 | Miller | 248/160 X |
| 4,330,779 | 5/1982 | Wilensky et al. | 345/7 |
| 4,713,007 | 12/1987 | Alban | 434/45 |
| 5,308,296 | 5/1994 | Eckstein | 482/5 |
| 5,451,134 | 9/1995 | Bryfogle | 414/680 |
| 5,490,784 | 2/1996 | Carmein | 434/55 |
| 5,496,220 | 3/1996 | Engstrand | 472/60 |
| 5,674,127 | 10/1997 | Horstmann et al. | 463/42 |
| 5,682,171 | 10/1997 | Yokoi | 345/7 |
| 5,798,739 | 8/1998 | Titel | 345/8 |

*Primary Examiner*—Dennis-Doon Chow
*Assistant Examiner*—Amr Awad
*Attorney, Agent, or Firm*—K. David Crockett, Esq.; Crockett & Crockett

[57] ABSTRACT

A compliant structure which includes a sensor for sensing translation and rotation of a top plate is disclosed. The structure is composed of a base plate and three supporting legs. The legs are compliant. The deflections of the structure are substantially in a plane and the translation and twist of the top platform may be measured by the gimbaled sensor assembly attached to one of the legs.

5 Claims, 7 Drawing Sheets

GIMBAL-MOUNTED VIRTUAL REALITY DISPLAY SYSTEM

This application is a continuation of co-pending application Ser. No. 08/630,948, filed Apr. 5, 1996.

BACKGROUND OF THE INVENTION

1. Field of Invention

This invention relates to the art of mechanical structures whose deformation can be easily measured.

2. Description of the Prior Art

In the field of virtual reality, displays are mounted on structures which can be manipulated by a user. The motion of the display is measured and is used to control the user's view point in a computer generated world. Such devices are exemplified by the art described in U.S. Pat. No. 5,436,638. Making a suitable structure for mounting a display on is a challenge, one desires that the display be movable with little force. It is also desirable that the platform encourages controllable motion which means that the perceived stiffness in the left—right directions be matched with forward—back and that twist also feels similarly stiff. As detailed in U.S. Pat. No. 5,436,638 it is desired that it be possible for the structure to facilitate rotations about a user. This invention provides that flexibility is a way which is easy to sense and measure.

SUMMARY OF THE INVENTION

A structure suitable for holding a display is the object of this invention. The platform is supported by three compliant members. One of these members is attached to a gimbaled mechanism which facilitates the easy measurement of the deflection of the platform as it is moved by the user.

Figure 1:
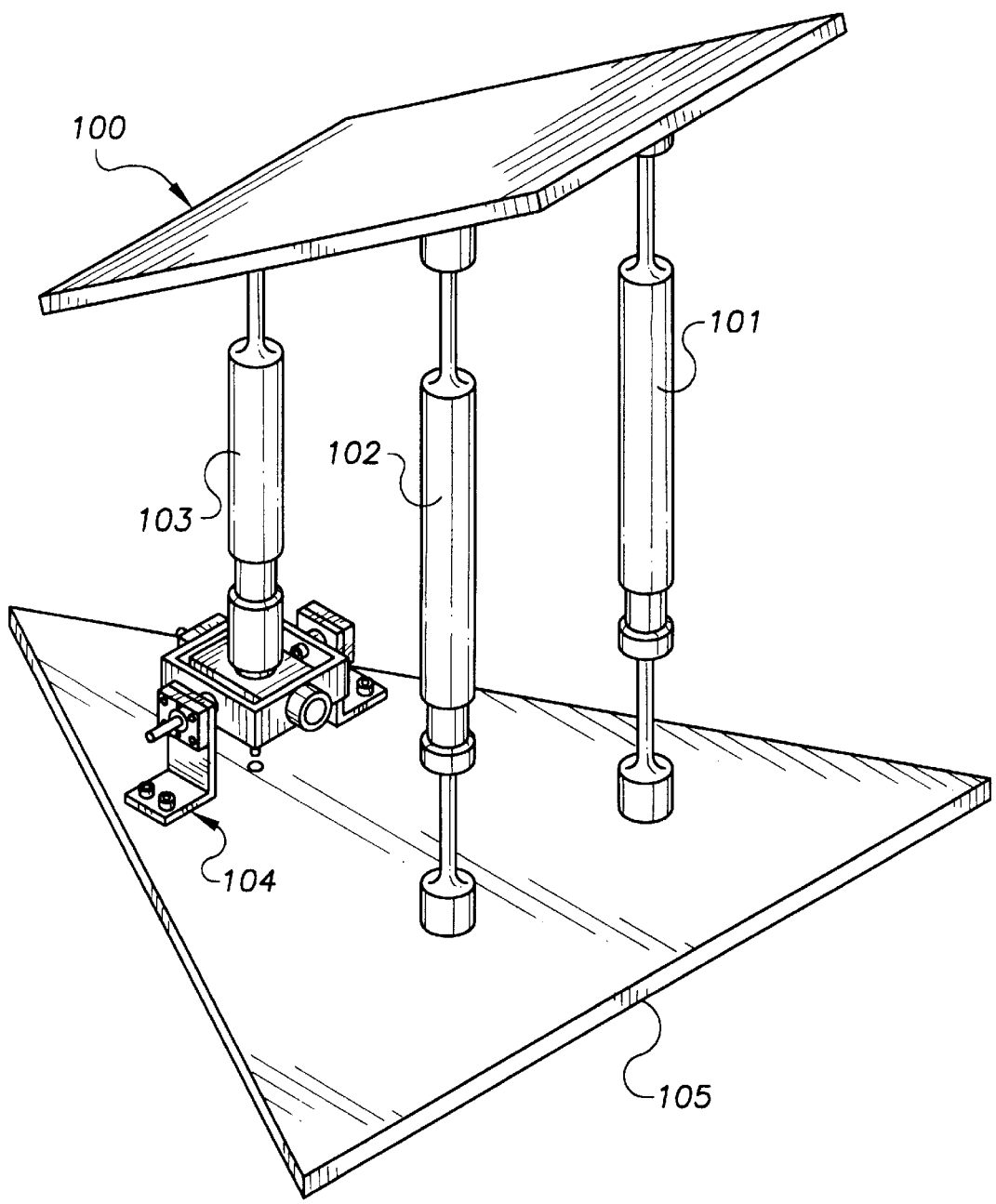
FIG. 1 shows the three legged structure, the plate where a display may be mounted, and king assembly.

Description of the Reference Numerals in the FIGURES

100 Flat plate for display
101 front right leg
102 front left leg
103 rear leg
104 gimbaled sensor assembly
105 base plate
201 front right leg
202 front left leg
203 rear leg
204 gimbaled sensor assembly
205 base plate
301 rear leg -continued Description of the Reference Numerals in the FIGURES 302 base plate
303 forward/back rotational joint of gimbals
304 left/right rotational joint of gimbals, and shaft for encoder
305 encoder shaft for forward/back rotational joint
306 part of gimbaled frame
307 part of gimbals frame for the rotational joint encoding twist
401 rear leg
402 shaft for encoder to measure twist of leg 401
403 base plate
404 rest of gimbaled assembly
501 gimbaled assembly
502 shaft for forward/back measurement
503 shaft for left/right measurement
504 shaft for twist measurement
505 mounting plate for encoder
506 encoder disk
507 encoder cover
508 mounting plate for encoder
509 encoder disk
510 encoder cover
511 mounting plate for encoder
512 encoder disk
513 encoder cover
514 encoder reader
515 encoder reader
516 encoder reader
517 threaded shaft for attachment to rear leg
601 display
602 compliant measured structure
701 main body of front leg
702 hinge at top of leg
703 hinge at bottotn of leg
704 angle at top of leg where it attaches to the plate the display rests on
705 mounting for attaching leg to base plate
706 slight necking to allow for cover clearance
707 radiused join between hinge 703 and main body 701
801 rear leg body
802 top hinge for rear leg
803 threaded mounting for gimbaled assembly

DESCRIPTION OF THE PREFERRED EMBODIMENTS

FIG. 1 shows the front view of the invention. The compliant measured structure is composed of a base plate 105 which supports the plate for the display 100 on three compliant delrin legs. The front legs 101 and 102 provide support for plate 100. The rear leg 103 provides support to 100 and mates with the gimbaled sensor assembly 104. The plate 100 is thus supported in a way such that it can be moved forward/back, side to side, and rotated about an arbitrary vertical axis. When the plate 100 is moved from its rest position, the three legged structure holds it level and the legs flex to accommodate the new position. As the legs flex, the display will move in the desired direction and will also get closer to the base 105 by a tiny amount. Deflections of the legs are generally small—in the range of about ±10 degrees or so.

Figure 2:
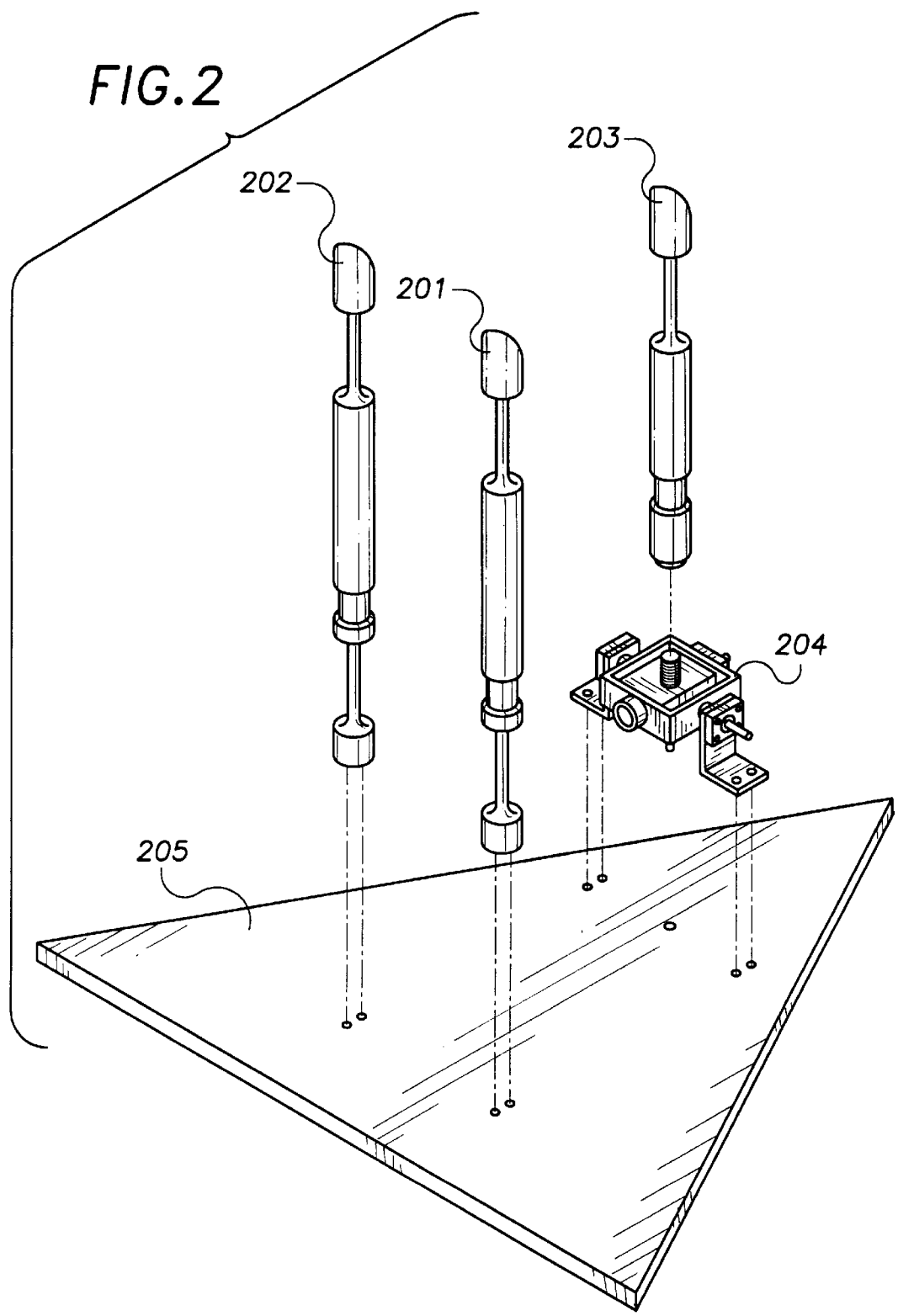
FIG. 2 is an exploded view of the base, legs, and sensor assembly.

FIG. 2 illustrates how the device is put together. The legs 201 and 202 are mounted directly onto base plate 205 with each leg being attached with two screws to the base plate so the legs 201 and 202 can not rotate in place. The gimbaled assembly 204 is also rigidly mounted onto base plate 205. The top of the gimbaled assembly is threaded and attaches to leg 203.

Figure 3:
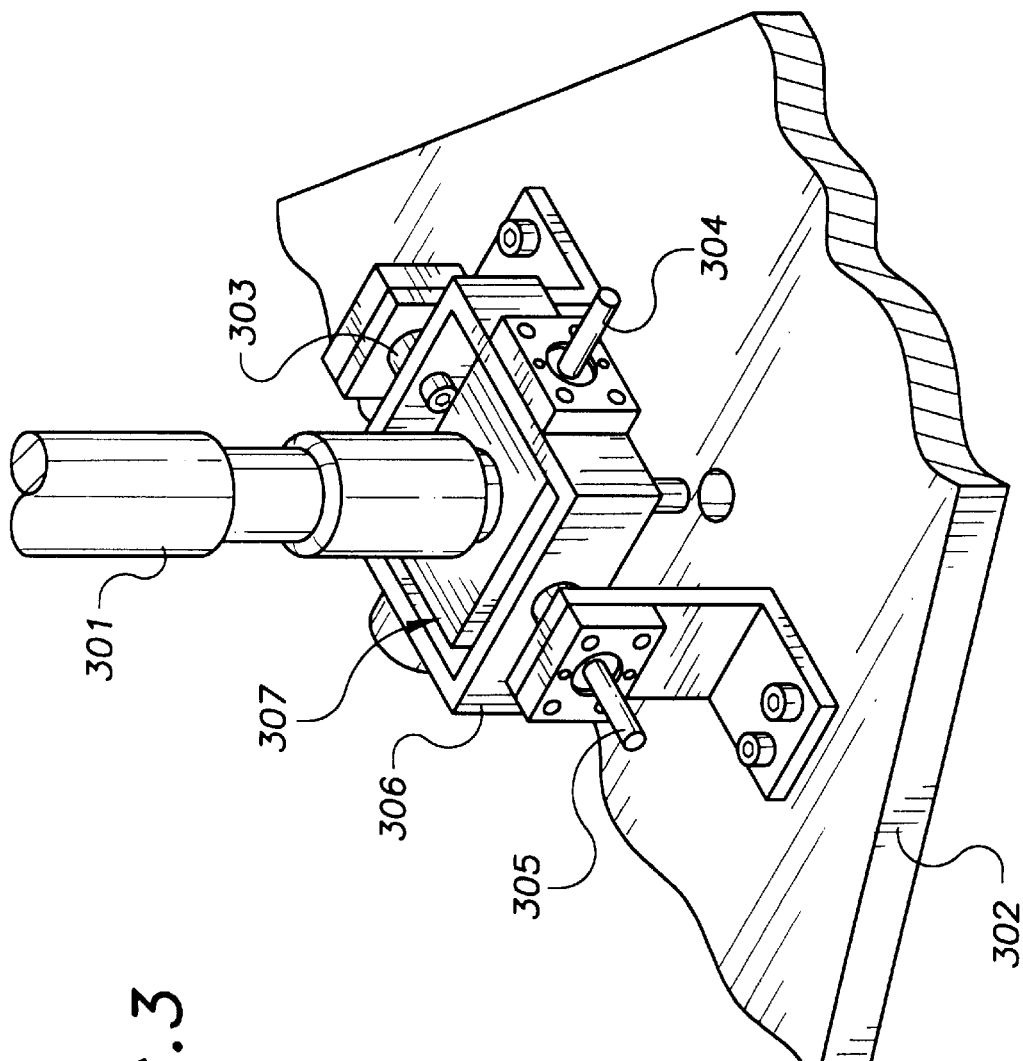
FIG. 3 shows the sensor assembly.

FIG. 3 shows the gimbaled assembly in more detail. The gimbaled assembly is mounted on base plate 302. The rear leg 301 is attached to the gimbaled assembly and the shaft which is attached to the leg 301 passes through block and rotary bearing 307. Rotary joint 303 provides rotation of frame 306 so that shaft and rotary joint 305 can measure the angle of leg 301 in the forward/back plane. The deflection of the leg 301 is transferred through block 307 to frame 306 which is measured by an encoder mounted on 305. The left/right motion of the top plate is transferred to a rotation of leg 301 which is transferred to block 307 and is measured by an encoder mounted on shaft 304. Thus we can see two of the three degrees of freedom of the gimbaled assembly—forward/back motion will appear at shaft 305 and left/right motion will appear at shaft 304.

Figure 4:
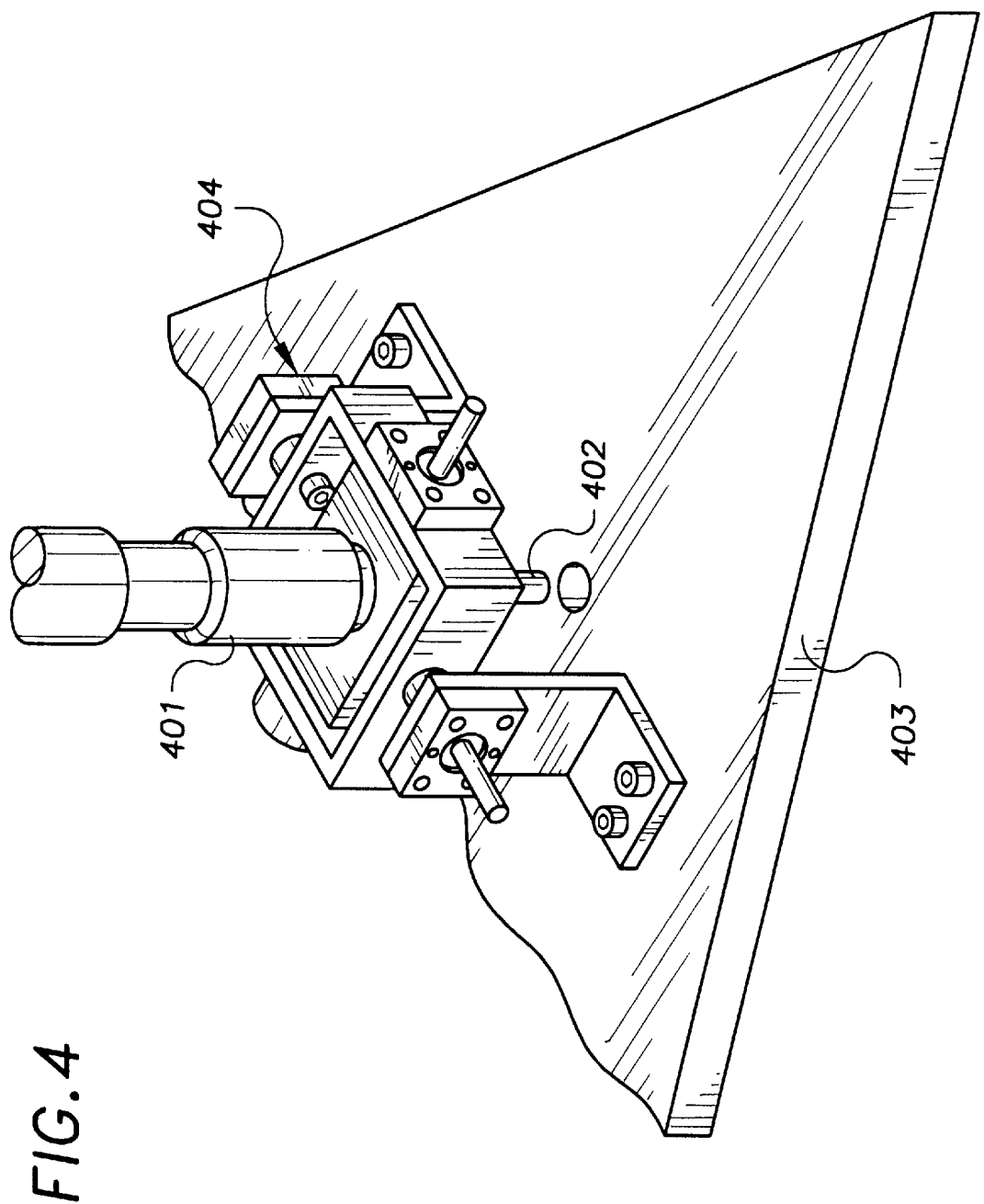
FIG. 4 shows the sensor assembly.

FIG. 4 shows another view of the gimbaled assembly. Rear leg 401 is attached to gimbaled assembly 404 which is mounted on base plate 403. The shaft 402 rotates with the rotation of leg 401 since they are attached. An encoder mounted on 402 will report the degree of twist of leg 401. Thus, as a torque is applied to the display plate 100, the rotation may be measured at shaft 402.

Figure 5:
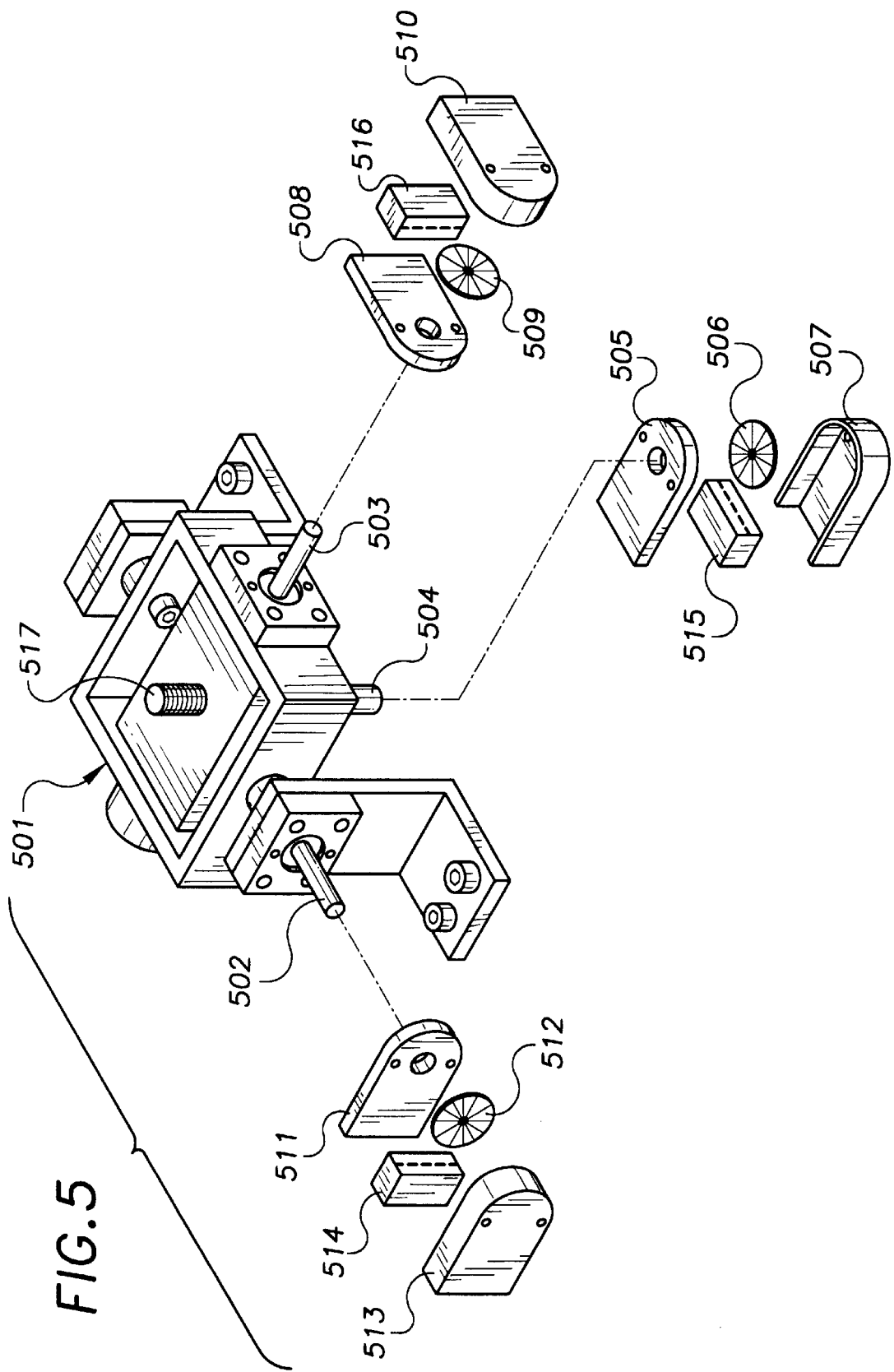
FIG. 5 shows where the encoders are mounted on the sensor assembly.

FIG. 5 illustrates how the encoders are mounted onto the gimbaled assembly 501. The rear leg is attached to threaded shaft 517. Shaft 503 encodes left/right motion of the platform and is measured by attachment of the encoder disk 509. The mounting plate 508, and reader 516 are mounted onto the gimbaled assembly. The cover 510 helps prevent dirt from fouling the encoder disk 509. Shaft 502 encodes forward/back motion of the platform. This motion is detected by attaching encoder disk 512 onto the shaft. The mounting plate 511 and reader 514 are attached to the gimbaled assembly and cover 513 prevents dirt from fouling the encoder disk. Twisting the platform results in a twist of the rear leg which is attached at 517 and appears at shaft 504 which is the other end of the threaded attachment point 517. Motion at shaft 504 is measured by attaching encoder disk 506 to the shaft 504. The base plate 505 and the reader 515 are attached to the gimbaled assembly and cover 507 prevents dirt from fouling the encoder disk 506.

Figure 6:
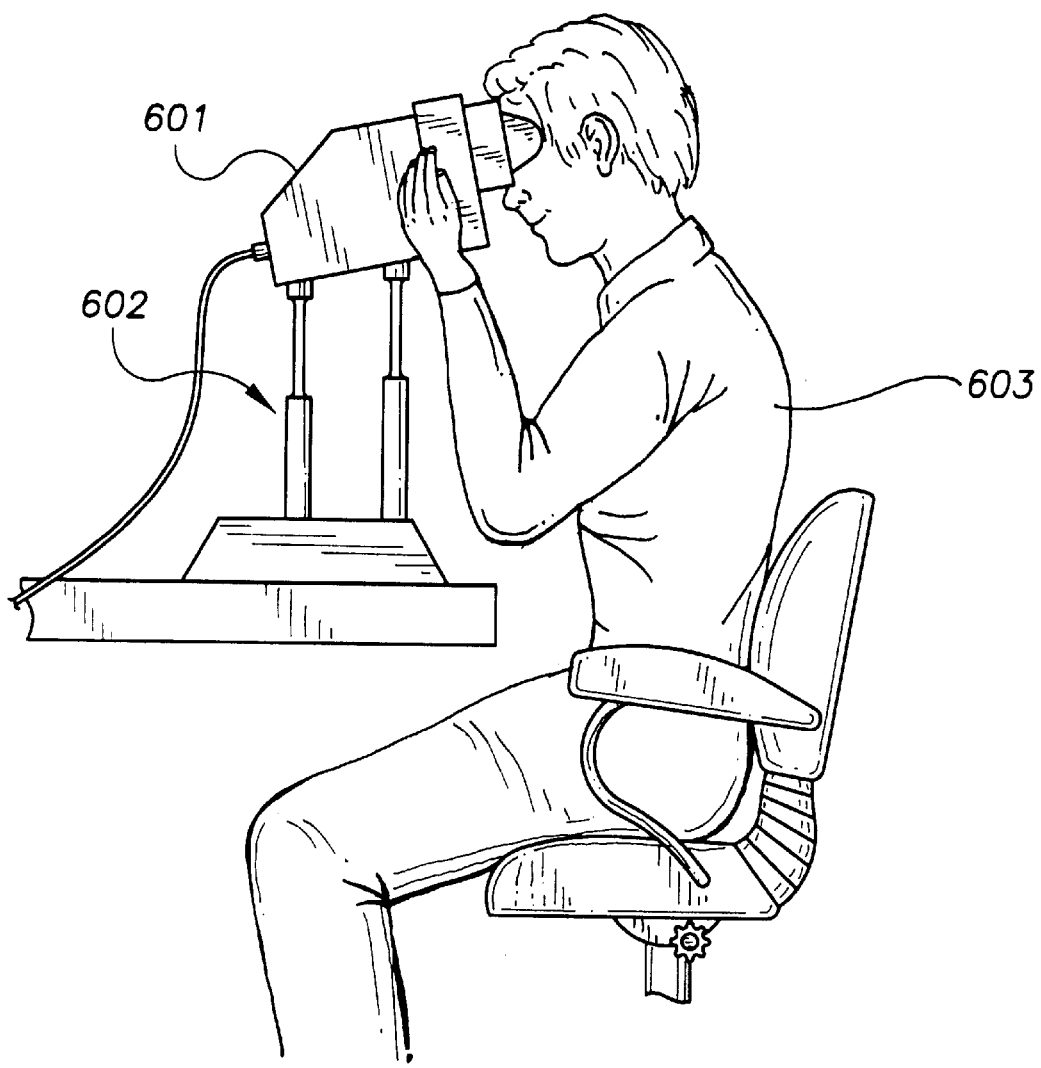
FIG. 6 shows how the display is mounted on the base and used.

FIG. 6 shows how the compliant platform is used. A user 603 looks into a display 601 mounted on the invention 602. The user may push the display forward and the encoders will register this motion and send it to the computer which is generating the images seen in the display 601. This will allow the user to move forward in the computer generated world. Pushing the display to the left will be measured in a similar fashion and the images updated accordingly. Twisting the display will be measured by the third encoder of the gimbals and will result in turning in the virtual world. Combining these motions lets a user maneuver easily in the virtual world. In particular, sliding to the right and twisting to the left at the same time results in an orbiting motion which is good for looking at the other side of an object. Slightly pushing forward at the same time results in a spiral path.

Figure 7:
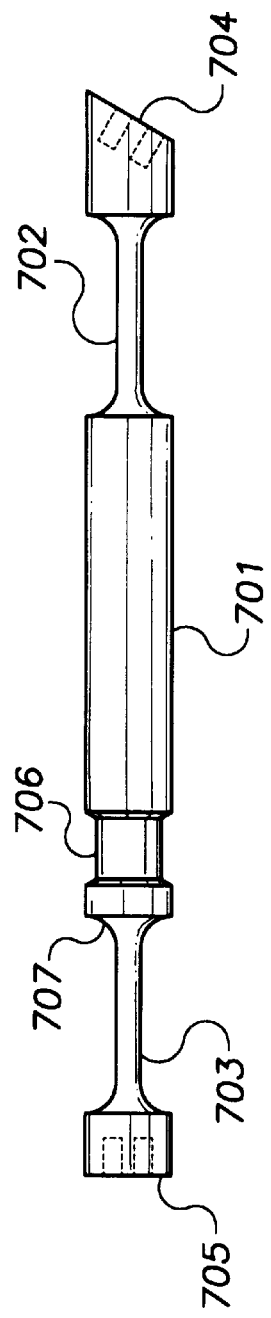
FIG. 7 shows the dimensions of the two front legs.

FIG. 7 shows the details on the construction of the front two legs. The main body of the delrin leg 701 joins the two flexible hinge areas 703 and 702. The leg is mounted with two screws to the base plate at the end 705. The end 704 is angled to mate with the mounting play for the display and is also attached with two fasteners so the leg can't rotate. The necking down 706 is so that a cover does not bind on the man body of the leg at maximum deflection. The joint between the hinges 703 and 702 with the main body of the leg 701 are radiused as shown at 707.

Figure 8:
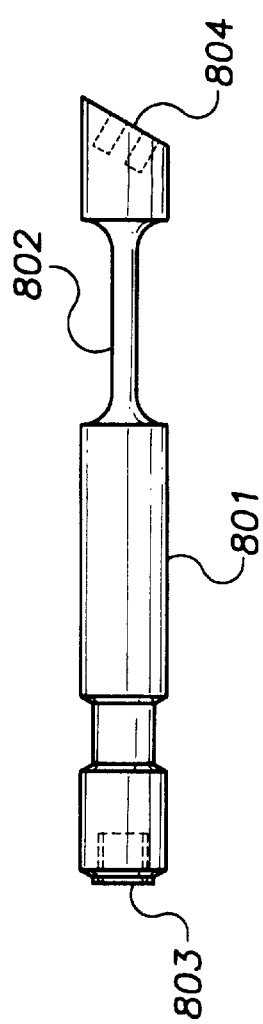
FIG. 8 shows the detail of the rear leg which attaches to the gimbaled sensor means.

FIG. 8 shows the structure of the rear leg. This delrin part is similar to the front legs. Main body 801 is attached to the gimbaled assembly by threaded hole 803. The plate for mounting the display is attached to the leg at the angled end 804. The hinge for the leg is 802 the transition from the main body of the leg to the hinge is radiused in a similar manner to the front legs.

The structure is compliant in that the three legs are springy. The top plate on which a display may be mounted moves substantially in a plane relative to the base plate. This motion is measured by the gimbaled sensor assembly at the base of the rear leg. The encoders used to measure the motion could be replaced by another sensing means. For example, the encoders could be replaced by rotary potentiometers to measure the angles. Another alternative would be to use rotary switches.

In addition to having the leg members including an explicit hinge point, it would be possible to design legs where the flexing occurred over the entire length of the leg. In this invention, the legs are made on a lathe from round stock but making legs whose hinge elements were not symmetric about the vertical axis would allow one to adjust the springiness in particular directions. By adjusting the cross section of the legs, a system could be made in which left—right motion was easy and forward—back motion more difficult for example.

It would be possible to have more than two compliant supporting legs if desired. Thus if the display were particularly heavy or for aesthetic reasons, a number of additional legs could be introduced without impacting the performance of the structure.

At present, the range of motion of the structure is limited by having a cover with three holes mounted part way up the structure. Then when the structure is pushed to the limit, the legs bang into the edges of the holes in the cover.

What is claimed is:

1. A display system mounted on a compliant structure comprising:

a first leg and a second leg, said first and second legs being attached at their lower ends to a base plate, and supporting at their upper ends a platform;

wherein the first leg is secured to the base plate with a gimbaled assembly allowing the first leg to tilt and rotate in relation to the base plate;

wherein the second leg is secured to the base plate in such a manner that it may tilt in relation to the base plate, but is restricted from rotating about an axis perpendicular to the plane of the base plate;

and wherein said platform is operably connected to a sensor assembly which senses the position of the platform in relation to the base plate; and an electronic display and a computer which generates and transmits an image to the electronic display, wherein the electronic display is mounted on the platform, and the sensor assembly provides information regarding the position of the platform to a computer, and wherein the computer generates and transmits images to the electronic display which vary according the sensed position of the platform.

2. A display system mounted on a compliant structure comprising:

a first leg and a second leg, said first and second legs being attached at their lower ends to a base plate, and supporting at their upper legs a platform;

wherein the first leg is secured to the base plate with a gimbaled assembly allowing the first leg to tilt and rotate in relation to the base plate;

wherein the second leg is secured to the base plate in such a manner that it may tilt in relation to the base plate, but is restricted from rotating about an axis perpendicular to the plane of the base plate;

and wherein said platform is operably connected to a sensor assembly which senses the position of the platform in relation to the base plate; and wherein the sensor assembly is operably connected to the first leg, and senses the tilt and rotation of the first leg; and an electronic display and a computer which generates and transmits an image to the electronic display, wherein the electronic display is mounted on the platform, and the sensor assembly provides information regarding the tilt and rotation of the first leg to a computer, and wherein the computer generates and transmits images to the electronic display which vary according the sensed position of the first leg.

3. A system for controlling the image displayed on a display screen, said system comprising:

a computer programmed to generate images for display on the display screen in response to physical movement of the display screen;

a platform supporting the display screen;

a base plate;

a first leg rotatably and tiltably secured to the base plate;

a second leg tiltably secured to the base plate;

wherein the display screen is supported by the first and second legs, and the display screen may be moved in relation to the base;

a sensor assembly operably connected to the first leg for sensing the tilt and rotation of the first leg, said sensor assembly also being operably connected to the computer and transmitting tilt and rotation information regarding the first leg to the computer;

said computer receives tilt and rotation information from the sensor assembly of the first leg, calculates the position of the display screen base upon said tilt and rotation information, generates an image for display on the display screen based upon the position of the display screen, and transmits said image to the display screen.

4. A system for controlling the image displayed on a display screen, said system comprising:

a computer programmed to generate images for display on the display screen in response to physical movement of the display screen;

a platform supporting the display screen;

a base plate;

a first leg rotatably and tiltably secured to the base plate;

a second leg tiltably secured to the base plate but not rotatable about an axis perpendicular to the plane of the base plate;

wherein the display screen is supported by the first and second legs, and the display screen may be moved in relation to the base;

a sensor assembly operably connected to the display screen to sense the position of the display screen, said sensor assembly also being operably connected to the computer and transmitting information regarding position of the display screen to the computer;

said computer being programmed to receive information regarding position of the display screen sensor assembly, generates an image for display on the display screen based upon the position of the display screen, and transmits said image to the display screen.

5. A system for controlling the image displayed on a display screen, said system comprising:

a computer programmed to generate images for display on the display screen in response to physical movement of the display screen;

a platform supporting the display screen;

a base plate;

at least one leg rotatably and tiltably secured to the base plate;

wherein the display screen is supported by the leg, and the display screen may be moved in relation to the base;

a sensor assembly operably connected to the display screen to sense the position of the display screen, said sensor assembly also being operably connected to the computer and transmitting information regarding position of the display screen to the computer;

said computer being programmed to receive information regarding position of the display screen sensor assembly, and for generating an image for display on the display screen based upon the position of the display screen, and transmitting said image to the display screen.

* * * * *